(12) United States Patent
Athey et al.

(10) Patent No.: US 9,688,899 B2
(45) Date of Patent: *Jun. 27, 2017

(54) CURABLE COMPOSITION FOR USE AS LOST CIRCULATION MATERIAL

(75) Inventors: Phillip S. Athey, Lake Jackson, TX (US); Bernard E. Obi, Missouri City, TX (US); Michael K. Poindexter, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/004,819

(22) PCT Filed: May 3, 2012

(86) PCT No.: PCT/US2012/036213
§ 371 (c)(1),
(2), (4) Date: Sep. 12, 2013

(87) PCT Pub. No.: WO2012/154473
PCT Pub. Date: Nov. 15, 2012

(65) Prior Publication Data
US 2014/0057811 A1    Feb. 27, 2014

Related U.S. Application Data

(60) Provisional application No. 61/484,272, filed on May 10, 2011.

(51) Int. Cl.
| | | |
|---|---|---|
| *C09K 8/035* | (2006.01) | |
| *C09K 8/508* | (2006.01) | |
| *C08G 18/67* | (2006.01) | |
| *C09D 175/16* | (2006.01) | |

(52) U.S. Cl.
CPC ............ *C09K 8/035* (2013.01); *C08G 18/672* (2013.01); *C09D 175/16* (2013.01); *C09K 8/5086* (2013.01)

(58) Field of Classification Search
CPC ........ C09K 8/035; C09K 8/5086; C09K 8/42; C09K 8/487; C09K 8/12; C09K 8/206; C09K 8/508; C09K 8/514; C09K 8/588; C09K 8/68; C09K 8/685; C09K 8/805; C09K 8/88; C09K 8/90; C09K 8/28; C09K 8/36; C09K 8/512; C09K 2211/1425; C09K 9/02; C09K 11/565; C09K 11/576; C09K 11/595; C09K 11/665; C09K 11/7421; C09K 11/7701; C09K 11/7731; C09K 11/7787; C09K 2211/1088; C09K 2211/1416; C09K 2211/1433; C09K 2211/145; C09K 2211/1466; C09K 2211/1475; E21B 2034/002; E21B 21/003; E21B 33/1208; E21B 33/13; E21B 33/134; E21B 33/138; E21B 33/16; E21B 34/00; E21B 34/14

See application file for complete search history.

(56) References Cited

U.S. PATENT DOCUMENTS

| | | | |
|---|---|---|---|
| 3,181,611 A | 5/1965 | Dollarhide | |
| 7,696,133 B2 | 4/2010 | Cowan | |
| 2006/0276348 A1* | 12/2006 | Cowan | C09K 8/5083 507/224 |
| 2009/0221452 A1 | 9/2009 | Whitfill et al. | |
| 2010/0087566 A1* | 4/2010 | Ballard | C09K 3/22 523/130 |
| 2011/0079389 A1* | 4/2011 | MacKay | E21B 33/138 166/281 |

FOREIGN PATENT DOCUMENTS

WO    2010019535    2/2010

* cited by examiner

*Primary Examiner* — Kumar R Bhushan

(57) ABSTRACT

The present invention relates to compositions and methods for reducing or preventing the loss of drilling fluids and other well servicing fluids into a subterranean formation during drilling or construction of boreholes in said formation. Specifically, this invention comprises a curable composition capable of free radical polymerization for creating lost circulation material in-situ. The curable composition comprises an organic compound capable of free radical (co)polymerization represented by the formula (I): wherein x is an integer from 1 to 8; Fp comprises one or more moiety comprising a free radical polymerizable group; L is an organic moiety comprising a (substituted) aromatic or (substituted) aliphatic group comprising one or more O, N, S, or combinations thereof; and Q comprises a substituted or unsubstituted mono- or polyvalent organic radical comprising one or one or more moiety selected from alkyl, alkylene, alkenyl, cycloalkyl, cycloalkylene, aryl, aralkyl, alkaryl, poly(oxyalkylene), poly(carboalkoxyalkylene), a substituted heterocyclic radical, or an unsubstituted heterocyclic radical.

9 Claims, 3 Drawing Sheets

CURABLE COMPOSITION FOR USE AS LOST CIRCULATION MATERIAL

FIELD OF THE INVENTION

The present invention relates to compositions and methods for reducing or preventing the loss of drilling fluids and other well servicing fluids into a subterranean formation during drilling or construction of boreholes in said formation. Specifically, this invention comprises a curable composition for creating lost circulation material in-situ.

BACKGROUND OF THE INVENTION

In the oil and gas industry, a common problem in drilling wells or boreholes in subterranean formations is the loss of circulation materials, such as fluids (for example, drilling fluids or muds), in a well or borehole during the drilling. Such lost fluids typically go into fractures induced by excessive mud pressures, into pre-existing open fractures, and/or into large openings with structural strength in the formation.

A large variety of materials have been used or proposed in attempts to cure lost circulation. Generally, such materials may be divided into five types or categories: fibrous materials, such as shredded automobile tires or sawdust; flaky materials, such as wood chips and mica flakes; granular materials, such as ground nutshells; slurries, whose strength increases with time after placement, such as hydraulic cement; and polymerizable compositions.

Polymerizable compositions comprise one or more monomer, typically, comprising optional components, such as for example fillers, which cure in situ downhole. Various polymerizable compositions are known and may comprise such polymerizable and/or polymeric materials as an epoxy resin, an organic siloxane, a phthalate resin, a (meth)acrylate resin, an isocyanate-based resin, a polyacrylamide, or the like. For examples see U.S. Pat. Nos. 3,181,611 and 7,696,133; and US Publication No. 2009/0221452 and 2010/0087566; and WO 2010/019535, each of which is incorporated by reference herein in their entirety.

Although many materials and compositions exist and have been proposed for preventing lost circulation, there continues to be a need for even more versatile and better compositions and methods for preventing loss of circulation.

SUMMARY OF THE INVENTION

The present invention provides such a curable composition useful as a drilling well lost circulation material, said curable composition comprising an organic compound capable of free radical (co)polymerization described by the following formula:

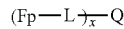

wherein:
x is an integer from 1 to 8;
Fp is a moiety comprising one or more free radical polymerizable group;
L is an organic moiety comprising a (substituted) aromatic or (substituted) aliphatic group comprising one or more O, N, S, or combinations thereof;
Q is a substituted or unsubstituted mono- or polyvalent organic radical comprising one or more moiety selected from alkyl, alkylene, alkenyl, cycloalkyl, cycloalkylene, aryl, aralkyl, alkaryl, poly(oxyalkylene), poly(carboalkoxyalkylene), a substituted heterocyclic radical, or an unsubstituted heterocyclic radical.

In one embodiment of the present invention, the moiety comprising a free radical polymerizable group (Fp) of the curable composition disclosed herein above comprises one or more unsaturated carbon-carbon double or triple bond, preferably said moiety comprising a free radical polymerizable group (Fp) comprises a vinyl ether, a vinyl ester, an allyl ether, an allyl ester, a vinyl ketone, styrene, α-methylstyrene, a vinyl amide, an allyl amide, an acrylamide, a maleate, a fumarate, or a (meth)acrylate, more preferably said moiety comprising a free radical polymerizable group (Fp) is derived from an α,β-unsaturated acid or an ester of an α,β-unsaturated acid, more preferably said moiety comprising a free radical polymerizable group (Fp) is derived from a (meth)acrylate.

In another embodiment of the present invention, the organic moiety (L) of the curable composition disclosed herein above comprises an alkylene group, an oxy group, a thio group, a urethane group, a carboxy group, a carbonyl group, an amido group, a carbamide group, an oxyalkylene group, a thioalkylene group, an carboxyalkylene, an amidoalkylene group, or mixtures thereof, preferably the organic moiety (L) comprises an aliphatic ester, an aromatic ester, an amide, a urethane, an ether, or a thioether, more preferably the organic moiety (L) comprises a urethane derived from an isocyanate, a diisocyanate, or a polyisocyanate.

In another embodiment of the present invention, the mono- or polyvalent organic radical (Q) of the curable composition disclosed herein above is derived from a polyalkylene oxide polyol, an amine terminated polyalkylene oxide, a hydroxyl terminated polyolefin, an amine terminated polyolefin, a silyl carbinol, a (co)polystryrenic polymer, or mixtures thereof, preferably the mono- or polyvalent organic radical (Q) is derived from a polyethylene oxide polyol, a polypropylene oxide polyol, a polybutylene oxide polyol, a copolymer of polyalkylene oxide polyol, a terpolymer of polyalkylene oxide polyol, a polytetramethylene oxide polyol, a polyalkylene oxide based on a polyol, a polyester polyol, or a polycarbonate polyol.

In yet another embodiment of the present invention, the curable composition disclosed herein above further comprises one or more initiator selected from a peroxide, a peroxy ester, a peroxy carbonate, a hydroperoxide, an alkylperoxide, an arylperoxide, or an azo compound, preferably the initiator is benzoyl peroxide, tert-butyl peroxide, dicumyl peroxide, hydrogen peroxide, diethyl peroxide, azobisisobutyronitrile, or mixtures thereof.

In yet another embodiment of the present invention, the curable composition disclosed herein above further comprises a stabilizing amount of one or more inhibitor, the one or more inhibitor is independently (if more than one) present in an amount equal to or greater than 0.1 weight percent and equal to or less than 10 weight percent based on the total weight of the curable composition, preferably the one or more inhibitor is hydroquinone, butylated hydroxytoluene (BHT), butylated hydroxyaniline (BHA), 2-hydroxy-4-methoxy benzophenone (UV-9), methyl ether hydroquinone (MEHQ), 4-benzyloxy phenol, or 3,5-diisopropyl phenol.

In yet another embodiment of the present invention, the curable composition disclosed herein above further comprises one or more reactive diluent comprising an ethylenically unsaturated group, preferably the one or more reactive diluent is a monomer having a (meth)acrylate group, a di(meth)acrylate, a poly(meth)acrylate, a polyethylene glycol di(meth)acrylate, a polypropylene glycol di(meth)acrylate, polybutylene glycol di(meth)acrylate, butanedioldi(meth)acrylate, hexanedioldi(meth)acrylate, trimethylolpropanetri(meth)acrylate, a monomer having one or more N-vinyl amide, or a vinyl ester, more preferably the one or more reactive diluent is methyl (meth)acrylate and/or butanediol di(meth)acrylate.

polymerizable group Fp. This is achievable by having more than one Fp linked to the backbone Q, for example, x may be equal to or greater than 2, preferably equal to or less than 8. In the herein above formula, x may be 1, 2, 3, 4, 5, 6, 7, or 8.

Hereinafter, the moiety comprising one or more free radical polymerizable group Fp is referred to as being derived from a general type or specific compound. Further, the substituted or unsubstituted mono- or polyvalent organic radical Q is also derived from a general type or specific compound. What is meant by this is that when the compound from which Fp is derived and the compound from which Q is derived are reacted together, a bond, or linkage (represented by L) is formed and a remnant of the compound from which Fp is derived is linked to the remnant of the compound from which Q. For example, in Scheme 1, the remnant of 2-hydroxyethyl methacrylate (HEMA) (Fp) is linked to the remnant of diisocyanate capped poly(propylene glycol) (Q) through a urethane link (L):

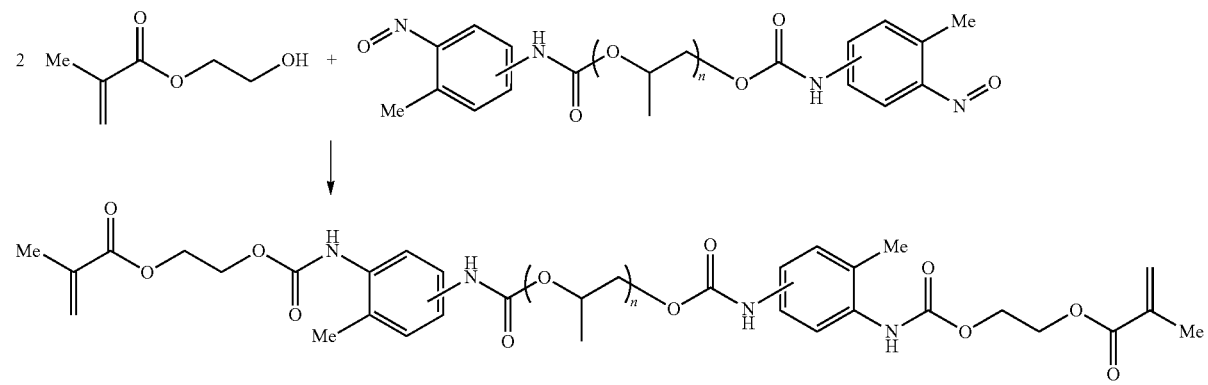

Scheme 1

Figure 5:
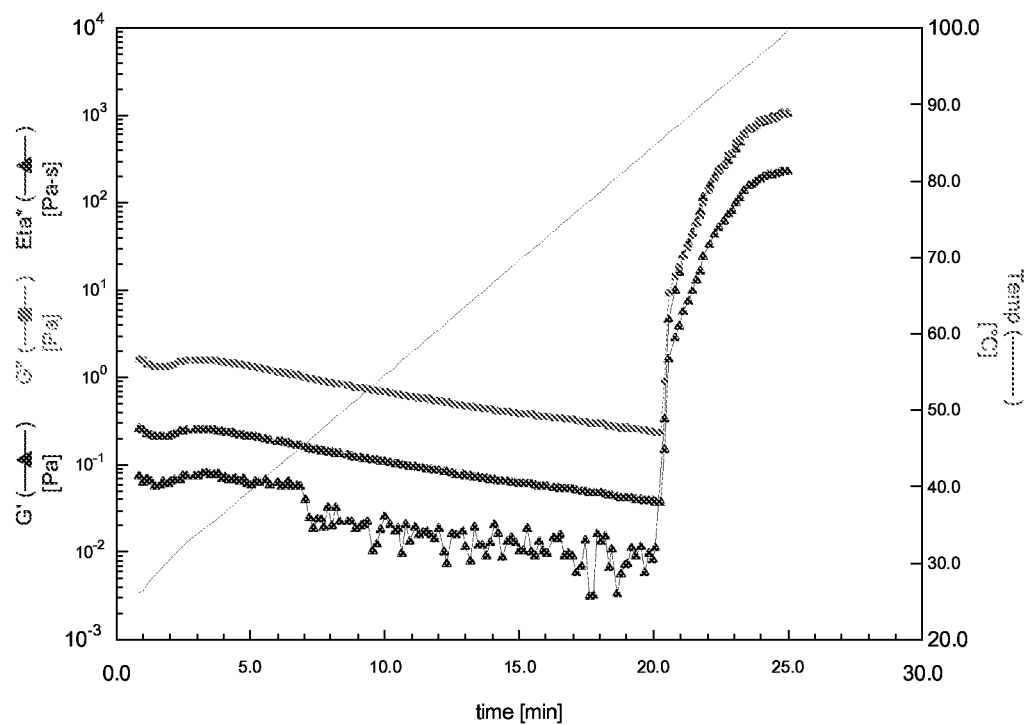

FIG. 5 is a plot of transient visocelastic modulus properties versus time generated DMA for Example 11.

Figure 6:
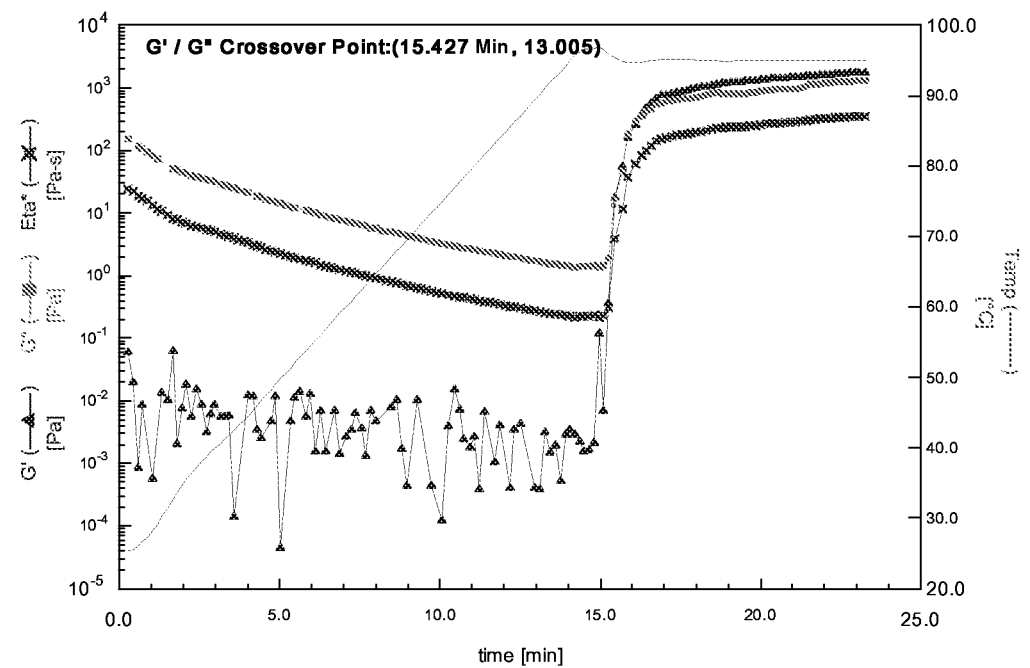

FIG. 6 is a plot of transient visocelastic modulus properties versus time generated DMA for Example 12.

DETAILED DESCRIPTION OF THE EMBODIMENTS

The present invention is a curable composition useful as a drilling well lost circulation material, said curable composition comprising an organic compound capable of free radical (co)polymerization described by the following formula:

$$(Fp-L)_x-Q$$

In one aspect, the invention comprises an organic free radical curable compound wherein Q represents the backbone of the compound, Fp represents a moiety comprising a free radical polymerizable group, and L represents a moiety that links Q to Fp. The moiety comprising a free radical polymerizable group Fp comprises at least one ethylenically unsaturated group that undergoes free radical initiated polymerization. Preferably, the curable composition comprises more than one ethylenically unsaturated, free radical In other words, if a pre-reacted compound is referred to as "a moiety comprising one or more free radical polymerizable group" it is understood that what is meant is the remnant of the compound from which the moiety comprising one or more free radical polymerizable group is derived after it has been linked to the backbone Q Likewise, if a pre-reacted compound from which the "mono- or polyvalent organic radical Q" is derived is referred to as Q, it is understood that what is meant is the remnant of the compound from which the mono- or polyvalent organic radical Q is derived after it has been linked to the moiety comprising one or more free radical polymerizable group Fp.

In the broadest terms, Q may comprise a substituted monovalent organic radical, a substituted polyvalent organic radical, an unsubstituted monovalent organic radical, or an unsubstituted polyvalent organic radical (referred to collectively as a substituted or unsubstituted mono- or polyvalent organic radical) comprising one or more moiety selected from alkyl, alkylene, alkenyl, cycloalkyl, cycloalkylene, aryl, aralkyl, alkaryl, poly(oxyalkylene), poly(carboalkoxyalkylene), a substituted heterocyclic radical, or an unsubstituted heterocyclic radical.

Particularly useful polyvalent organic radicals are based on polyols which maybe capped or uncapped. Suitable polyols include polyether polyols, polyester polyols, polycarbonate polyols, silyl carbinols and polyolefin hydroxyl terminated polyols. Preferably, the polyol has a hydroxyl functionality of 2 to 8, preferably 2 to 6, more preferably 2 to 4, and more preferably 2 to 3. Among those polyols which are particularly preferred are polyalkylene oxide polyols such as polyethylene oxide polyol, polypropylene oxide polyol, polytetramethylene oxide polyol, ethylene oxide- and propylene oxide-terminated derivatives.

Polyether polyols are particularly preferred for use in the backbone Q of the present invention and may comprise the polymerization product of epoxide with either water or polyhydric alcohol, sometimes referred to as a polyol initiator. Illustrative epoxides that may be employed in the preparation of polyether polyols useful in the invention include short chain (e.g., about 2 to 8, preferably 2 to 6 carbon atoms) allylene oxides such as ethylene oxide, propylene oxide, butylene oxide and amylene oxide; glycidyl ethers such as t-butyl glycidyl ether and phenyl glycidyl ether; and random or block copolymers of two or more of these epoxides.

Suitable polyhydric alcohols that may be employed as a polyol initiator for making polyether polyols suitable for use in the invention preferably have from two to eight hydroxyl groups and include short chain diols (e.g., having about 2 to 7 carbon atoms) such as ethylene glycol, 1,2-propane diol, 1,4-butane diol, 1,3-butane diol, 1,5-pentane diol, and 1,7-heptane diol; compounds derived from phenols such as bis-phenol A; and materials having more than two hydroxyl groups such as glycerol, 1,1,1-trimethylolpropane, 1,1,1-trimethylolethane, hexane-1,2,6-triol, α-methyl glucoside, pentaerythritol, pentatols, hextols, and various sugars (e.g., glucose, sucrose, fructose, sorbitol, and maltose).

One such polyol suitable for use in the present invention is a polyalkylene polyether polyol (sometimes referred to as polyalklene oxide polyols). Polyalkylene polyether polyols may be prepared from the short chain alkylene oxides described herein above as well as other starting materials such as tetrahydrofuran and epihalohydrins such as epichlorohydrin. Alkylene oxide tetrahydrofuran copolymers may also be used. Also useful are arylene oxides such as styrene oxide which can be used to form polyarylene oxide polyols. The most preferred polyalkylene polyether polyols are polypropylene oxide polyol, polyethylene oxide polyol, and polytetramethylene oxide polyol, including ethylene oxide or propylene oxide-terminated derivatives thereof.

Polyester polyols are also useful as compounds comprising the backbone Q of the present invention and may be prepared by reacting one or more diols with one or more dicarboxylic acids. Diols which may be used to make polyester polyols useful in the invention include saturated diols having the general structure HO—(CH$_2$)$_y$—OH where the integral value of y is about 2 to 8, preferably 2 to 6, examples of which include ethylene glycol, propylene glycol, 1,4-butane diol, and 1,6-hexane diol. Dicarboxylic acids which may be used to make polyester polyols useful in the invention include saturated dicarboxylic acids having the general structure HOOC—(CH$_2$)$_z$—COOH where the integral value of z is about 4 to 8, examples of which include adipic acid and sebacic acid. Aromatic dicarboxylic acids may also be used.

Polyester polyols based on poly-ε-caprolactone are particularly preferred and can be obtained from a ring-opening polymerization of ε-caprolactone. The CAPA™ family of poly-ε-caprolactone polyols from Solvay are particularly useful materials. Poly-ε-caprolactone polyols may be used singularly or in mixtures. Poly-ε-caprolactone polyols are a particularly preferred polyester polyol.

Suitable polyols may be capped, for example with toluene diisocyanate (TDI), diphenylmethane diisocyanate (MDI), epichlorohydrin, bis-oxides (Bisphenol-A, Bisphenol F, and the like), phosgene, hexamethylene-1,6-diisocyanate (HDI), naphthalene diisocyanate (NDI), methylene bis-cyclohexylisocyanate (HMDI or hydrogenated MDI), isophorone diisocyanate (IPDI). etc.

Preferably, the mono- or polyvalent organic radical Q of the present invention comprise a mono- or polyvalent organic radical derived from a polyalkylene oxide polyol, an amine terminated polyalkylene oxide, a hydroxyl terminated polyolefin, an amine terminated polyolefin, a silyl carbinol, a (co)polystryrenic polymer, or mixtures thereof. More preferably the mono- or polyvalent organic radical Q is derived from a capped or uncapped polyethylene oxide polyol, a polypropylene oxide polyol, a polybutylene oxide polyol, a copolymer of polyalkylene oxide polyol, a terpolymer of polyalkylene oxide polyol, a polytetramethylene oxide polyol, a polyalkylene oxide based on a polyol, a polyester polyol, or a polycarbonate polyol.

The viscosity of the curable composition of the present invention may be modified by adjusting the molecular weight of the organic radical (Q) so that the reaction mixture can better flow and provide coverage into the reservoir openings. The wettability of the organic radical (Q) can also be varied to more favorably interact with and bind to water-wet, oil-wet or mixed-wet reservoirs. For example, an organic radical (Q) containing more ethylene oxide would interact better with water-wet reservoirs, while an organic radical (Q) containing more propylene oxide or butylenes oxide would interact better with oil-wet reservoirs.

The backbone Q is capped with one or more moiety containing a free-radical polymerizable group Fp, wherein the free-radical polymerizable group is preferably an alkene group. The alkene group may be unsubstituted or substituted or part of a cyclic ring structure. Substituted alkenes include those alkenes having alkyl or aryl group substitution. Preferred alkenes are those having terminal unsubstituted double bonds such as allyl or vinyl groups. Even more preferred alkenes are styryls. The most preferred alkenes are acrylic-group containing materials.

In most general terms, the moiety comprising a free radical polymerizable group (Fp) comprises one or more unsaturated carbon-carbon double or triple bond. For example, the moiety comprising a free radical polymerizable group (Fp) may comprise a vinyl ether, a vinyl ester, an allyl ether, an allyl ester, a vinyl ketone, styrene, α-methylstyrene, a vinyl amide, an allyl amide, an acrylamide, a maleate, a fumarate, or a (meth)acrylate. Other suitable moieties comprising a free radical polymerizable group (Fp) are derived from an α,β-unsaturated acid or an ester of an α,β-unsaturated acid.

Compounds from which moieties comprising suitable free radically polymerizable groups are derived include the diacrylates and dimethacrylates described in U.S. Pat. Nos. 3,043,820; 3,457,212; 3,923,737; and 3,944,521, all of which are incorporated herein by reference in their entirety. Other suitable polymerizable monomers include acrylate-terminated monomers such as the polyacrylate esters formed from organic polyisocyanates, such monomers being described, for example, in U.S. Pat. Nos. 3,425,988; 4,018,351; 4,295,909; 4,309,526; and 4,380,613, all of which are incorporated herein by reference in their entirety. A preferred moiety comprising a free radical polymerizable group (Fp) is derived from an acrylate or methacrylate, referred to collectively as (meth)acrylate. Particularly suitable compounds from which polyfunctional (meth)acrylates moieties are derived include triethyleneglycol dimethacrylate, ethyleneglycol dimethacrylate, tetraethyleneglycol dimethacrylate, polyethyleneglycol, diacrylate, polyethyleneglycol dimethacrylate, 1,3-butyleneglycol dimethacrylate, trimethylol propane trimethacrylate, neopentylglycoldimethacrylate, ethoxylated Bisphenol A dimethacrylate, Bisphenol F dimethacrylate, propoxylated Bisphenol C dimethacrylate and Bisphenol A bis(2-hydroxypropyl)dimethacrylate. A particularly preferred acrylate moiety comprising a free radical polymerizable group is derived from 2-hydroxyethyl methacrylate.

The organic compound capable of free radical (co)polymerization of the present invention is the reaction product of one or more compound comprising a free radical polymerizable group (from which the moiety comprising the free radical polymerizable group Fp is derived) and a substituted or unsubstituted mono- or polyvalent organic radical Q, such as derived from a polyvalent polyol. These two components react or combine or are linked together by L, an organic moiety comprising a (substituted) aromatic or (substituted) aliphatic group comprising one or more O, N, S, or combinations thereof. Depending on the compositions of the compounds providing Fp and Q, the linker L may be an organic moiety that comprises an alkylene group, an oxy group, a thio group, a urethane group, a carboxy group, a carbonyl group, an amido group, a carbamide group, an oxyalkylene group, a thioalkylene group, an carboxyalkylene, an amidoalkylene group, an aliphatic ester, an aromatic ester, an amide, a urethane, an ether, a thioether, or mixtures thereof. For example, the organic moiety (L) may comprise a urethane linkage if Fp comprises an alcohol and Q is capped with an isocyanate, a diisocyanate, or a polyisocyanate.

In one embodiment of the present invention, the organic compound capable of free radical (co)polymerization comprises a polycaprolactone acrylate capped polyol, for example see U.S. Pat. No. 4,632,975, which is incorporated herein by reference in its entirety. The polyfunctional acrylate derivative may be prepared by reacting the caprolactone polyol (from which the divalent organic compound Q is derived) with acrylic or methacrylic acid (from which the moiety comprising a free radical polymerizable group Fp is derived) in the presence of a acid catalyst, whereby they are linked through an ester (—OOC—) linkage L. The acid catalyst may be sulfuric, methane sulfonic, or p-toluene sulfonic acid, or ion exchange resins, and the like. The catalyst is used in amounts of from about 0.1 to about 5.0, preferably from about 0.5 to about 2.0 percent. In the reaction, one hydroxyl equivalent of the caprolactone polyol is reacted with excess of acrylic acid or methacrylic acid to form the caprolactone polyol acrylate. A hydroxyl containing acrylated polyol can also be prepared by reacting an excess equivalent of polyol with (meth)acrylic acid.

In another embodiment, Q is derived from a prepolymer (i.e. isocyanate terminated polyetherpolyol) which is reacted with a compound comprising a free radical polymerizable group (from which the moiety comprising the free radical polymerizable group Fp is derived) having an labile or active hydrogen containing compound. The isocyanate-terminated prepolymer may be prepared by reacting a diol or polyol with a diisocyanate, whose NCO functionality is about two, to form a prepolymer having terminal isocyanate groups. Polyisocyanates useful in the invention include various aliphatic, cycloaliphatic, aromatic, and mixed (cyclo)aliphatic-aromatic diisocyanates. In general, aliphatic diisocyanates are preferred, especially when utilized to prepare isocyanate prepolymers or quasi prepolymers.

Among the useful diisocyanates are ethylene diisocyanate, ethylidene diisocyanate, propylene diisocyanate, butylene diisocyanate, hexamethylene diisocyanate (including dimers and trimers thereof), dichlorohexamethylene diisocyanate, cyclopentylene-1,3-diisocyanate, cyclohexylene-1,4-diisocyanate, cyclohexylene-1,2-diisocyanate, isophorone diisocyanate, furfurylidene diisocyanate, toluene diisocyanate, 2,2-diphenylpropane-4,4'diphenylmethane diisocyanate, p-phenylene diisocyanate, m-phenylene diisocyanate, x-ylylene diisocyanate, 1,4-naphthylene diisocyanate, 1,5-naphthylene diisocyanate, m-tetramethyl xylylene diisocyanate, polymeric versions of 4,4'-methylene diphenyl diisocyanate, diphenyl-4,4'diisocyanate, azobenzene-4,4'diisocyanate, diphenylsulphone-4,4'-diisocyanate, and 1-chlorobenzene-2,4-diisocyanate. If Fp is derived from an acrylic monomer, then highly crystalline aromatic materials that are insoluble in acrylic monomer (e.g., pure 4,4'-methylene diphenyldiisocyanate) would not be used.

Various tri- and tetraisocyanates may also be used such as 4,4',4"-triisocyanatotriphenylmethane, 1,3,5-triisocyanatobenzene, 2,4,6-triisocyanatotoluene, and 4,4'dimethyldiphenylmethane-2,2',5,5'-tetraisocyanate.

The isocyanate-terminated prepolymer may then be reacted with an effective amount of a terminal (meth)acrylate group containing compound capable of converting the terminal isocyanate groups on the first prepolymer to terminal (meth)acrylate groups. To form the linkage, the (meth)acrylate containing compound must contain a terminal group that is either an isocyanate reactive amino, carboxylic acid, or hydroxyl group. Preferred hydroxyl compounds include hydroxylated (meth)acrylates and (meth)acrylamides, wherein the use of the parenthetical expression (meth) indicates that the methyl substitution is optional. As discussed herein above, adducts of hydroxylated (meth)acrylates or (meth)acrylamides with lactones (e.g., ε-caprolactone), so as to form hydroxy(meth)acrylate polyesters, are also particularly useful.

A preferred organic compound capable of free radical polymerization comprises the reaction product of an isocyanate prepolymer with a hydroxylated (meth)acrylate such as hydroxyethylmethacrylate, hydroxyethylacrylate, hydroxybutylacrylate or adducts of these hydroxylated (meth)acrylates with ε-caprolactone.

Other suitable compounds for capping an isocyanate terminated polyetherpolyol (or any substituted or unsubstituted mono- or polyvalent organic radical in general) are methacrylic acid, acrylic acid, and similar α,β-unsaturated carboxylic acids, and half-ester such as the 2-hydroxyethyl (meth)acrylate half-esters of maleic acid. Other suitable half-esters include those described in U.S. Pat. Nos. 3,428,614 and 4,080,238, and 4,209,604 all of which are incorporated herein by reference in their entirety.

Still other suitable monomers for capping isocyanate terminated polyetherpolyol (or any substituted or unsubstituted mono- or polyvalent organic radical in general) include the (meth)acrylate functional phosphorus containing monomers described in U.S. Pat. Nos. 4,044,044; 4,259,117; 4,434,278; and 4,442,239; all of which are incorporated by reference in their entirety.

Other suitable polymerizable monomers useful in the inventive compositions for capping capping isocyanate terminated polyetherpolyol (or any substituted or unsubstituted mono- or polyvalent organic radical in general) are acrylic and methacrylic functional silicones.

In another embodiment of the present invention, other acrylic monomers useful for deriving Fp include ethylene glycol dimethacrylate, propylene glycol diacrylate, polyethylene glycol diacrylate, polypropylene glycol diacrylate, tetraethylene glycol dimethacrylate, tetraproylene glycol dimethacrylate, diglycerol diacrylate, diethylene glycol dimethacrylate, dieprolene glycol dimethacrylate, pentaerythritol triacrylate, trimethylolpropane trimethacrylate, as well as other polyether diacrylates and dimethacrylates.

A initiator is useful in the application of the present invention. The use of initiators is known in the art and the invention is not intended to be limited to any particular type. Suitable free radical initiating initiator or initiator systems may include, for example, but not be limited to an azo compound such as azobisisobutyronitrile, a peroxide for example an alkyl or an acyl peroxide or hydroperoxide, a ketoperoxide, a peroxy esters, a peroxy carbonate, and a peroxy ketal, or mixtures thereof. Such compounds vary with respect to activation temperature and half-life or, in other words, the temperature at which their reaction is initiated and becomes extensive. Examples of suitable alkyl peroxides, dialkyl peroxides, hydroperoxides, acyl peroxides, peroxy esters and peroxy ketals include, but are not limited to benzoyl peroxide, tert-butyl peroxide, hydrogen peroxide, diethyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl)peroxide, diisobutyl peroxide, t-butyl perbenzoate, and t-butyl peracetate, or mixtures thereof. The initiator may be employed in total amounts from about 0.001 to about 20 weight percent based upon the weight of the polymerizable monomer. For reservoirs containing ferrous iron or other metals capable of behaving as a reducing agent that polymerization can be initiated via an oxidation-reduction reaction with one of the previously listed peroxides or hydroperoxides. This type of initiation is commonly called redox initiation. For this invention, the reducing agent can also be added to the reaction mixture The rate of polymerization for the curable composition of the present invention is dictated by the initiators and may be accelerated, reduced, or delayed by the use of one or more initiators. More specifically, the rate of polymerization as dictated by the initiators may be accelerated, reduced or delayed by the concentration of initiator employed.

Likewise an inhibitor may be required and the curable composition of the present invention is not intended to be limited to any particular inhibitor. Those skilled in the art would recognize suitable inhibitors. Examples of suitable inhibitors for free radical polymerization reactions include, for example, benzoyl quinone, parabenzoquinone, tertiary butyl catechol, and the like, and mixtures thereof, which exhibit efficacy at elevated temperatures. Some inhibitors are not adequately effective at elevated temperatures. Additional examples of inhibitors include hydroquinones, such as, for example hydroquinone, methyl hydroquinone and methyl ethyl hydroquinone (MEHQ), butylated hydroxytoluene (BHT), butylated hydroxyaniline (BHA), 2-hydroxy-4-methoxy benzophenone (UV-9), 4-benzyloxy phenol, or 3,5-diisopropyl phenol. Polyols, polyhydroxy ethers, alcohols and bases are inhibitors for acid-catalyzed condensation reactions. The quantity of inhibitor is adapted to the reactive, polymerizable prepolymer and monomer components in question. In general the inhibitor is present in a amount equal to or greater than 0.01 weight percent, preferably equal to or greater than 0.05 weight percent, more preferably equal to or greater than 0.1 weight based on the total weight of the curable composition. In general the inhibitor is present in a amount equal to or less than 10 weight percent, preferably equal to or less than 5 weight percent, more preferably equal to or less than 2 weight based on the total weight of the curable composition. The preferred quantity results in the proper exothermic process and short curing time or for example, to minimize undesired free radical polymerization under shipping and storage conditions.

A initiator is preferably used, but an inhibitor is not always necessary. When the temperature in the well is elevated, say for example, higher than 150° C., the reaction may go too fast. At that point an inhibitor may be added, which may act as a free radical scavenger, and prevents the polymerization from proceeding too fast. Eventually the inhibitor may be used up and the free radical or acid groups then initiate polymerization, which is subsequently self-sustaining. In some high temperature wells the inhibitor can only decrease the polymerization a limited amount and where the inhibitor has limited effectiveness there may be a negative impact on the molecular weight of the geosynthetic composite in that it is lower than would be optimally desirable.

One or more reactive diluent may be added to the curable composition of the present invention, preferably the reactive diluent comprises an ethylenically unsaturated group. Suitable reactive diluents include monomers having a (meth) acrylate group, a di(meth)acrylate, a poly(meth)acrylate, a polyethylene glycol di(meth)acrylate, a polypropylene glycol di(meth)acrylate, butanedioldi(meth)acrylate, hexanedioldi(meth)acrylate, polybutylene glycol di(meth)acrylate, trimethylolpropanetri(meth)acrylate, one or more N-vinyl amide, or a vinyl ester. Preferably reactive diluents are methyl (meth)acrylate and/or butanediol di(meth)acrylate.

A solvent may be employed to dilute the blend of the selected formulation, improve wetting of formation surfaces. The solvent should be miscible with water and hydrocarbons and may be selected from any convenient type, which would be apparent to those skilled in the art. Suitable solvents include, but are not limited to low molecular weight anhydrous alcohols such as methanol, ethanol, propanol; ethers and polyethers, such as tetrahydrofuran, dioxane, ethylene glycol monoalkyl ethers, polyethylene glycol monoalkylethers or glycol ether esters; ether alcohols such as 2-butoxyethanol, or mixtures thereof. Preferred solvents include ethylene glycol monobutyl ether, propylene glycol methyl ether acetate, and other solvents effective for dissolving the thermoplastic elastomer, or mixtures thereof. A suitable concentration of solvent can range from 0 to 50 weight percent, more preferably 1 to 35 weight percent, and most preferably 5 to 25 weight percent.

Other additives can be incorporated into the formulation including, but not limited to coupling agents, suspending agents, dyes, weighting agents, and lost circulation materials.

One particularly useful additive is a thickener such as medium (about 100,000) molecular weight polymethyl methacrylate which may be incorporated in an amount of about 10 to 40 weight percent, based on the total weight of the curable composition. Thickeners may be employed to increase the viscosity of the composition to a more easily room temperature applied viscous syrup-like consistency.

Another useful adjuvant is an (meth)acrylic monomer cross linking agent. Acrylic monomer cross linking agents can be used to enhance the solvent resistance of the adhesive bond, although certain compositions of the invention have good solvent resistance even in the absence of externally added acrylic monomer cross linking agents. Typically employed in an amount of about 0.2 to 10 weight percent based on the total weight of the curable composition, useful acrylic monomer cross linkers include the various diacrylates referred to above as possible acrylic modifying monomers as well as other materials. Particular examples of suitable acrylic monomer cross linking agents include ethylene glycol dimethacrylate, ethylene glycol diacrylate, triethyleneglycol dimethacrylate, diethylene glycol bismethacryloxy carbonate, polyethylene glycol diacrylate, tetraethylene glycol dimethacrylate, diglycerol diacrylate, diethylene glycol dimethacrylate, pentaerythritol triacrylate, trimethylolpropane trimethacrylate, as well as other polyether diacrylates and dimethacrylates.

Numerous coupling agents are known in the art and the invention is not intended to be limited to particular agents. In some embodiments, the coupling agent may include silane coupling agents. A suitable silane coupling agent may be selected from among vinyltrimethoxysilane, vinyltriethoxysilane, vinyltris (β-methoxyethoxy)silane, vinylmethyldimethoxysilane, vinylmethyldiethoxysilane, δ-glycidoxypropyltrimethoxysilane, δ-glycidoxypropylmethyldimethoxysilane, δ-methacryloxypropyltrimethoxysilane, δ-methacryloxypropylmethyldimethoxysilane, acryloxypropyltrimethoxysilane, acryloxypropylmethyldimethoxysilane, and the like. A suitable concentration for a coupling agent is in the range of 0 to 10 weight percent.

Suspending agents known in the art can be added to the formulation to support solids. The invention is not intended to be limited to any particular agents, however suitable suspending agents include, for example, organophilic clays, amine treated clays, oil soluble polymers, quaternary ammonium compounds, polyamide resins, polycarboxylic acids, and soaps.

The formulation may also contain other common treatment fluid ingredients such as fluid loss control additives, dyes, anti-foaming agents when necessary, and the like, employed in typical quantities, known to those skilled in the art. Of course, the addition of such other additives should be avoided if it will detrimentally affect the basic desired properties of the treatment fluid.

Weighting agents or density materials may be added to the formulation. Suitable materials include, for example, galena, hematite, magnetite, iron oxides, ilmenite, barite, siderite, celestite, dolomite, calcite, manganese oxides, magnesium oxide, zinc oxide, zirconium oxides, spinels and the like. The quantity of such material added, if any, depends upon the desired density of the chemical treatment composition. Typically, weight material is added to result in a drilling fluid density of up to about 9 pounds per gallon. The weighted material is preferably added up to 5 pounds per barrel and most preferably up to 500 pounds per barrel of resin blend.

Lost circulation additives may also be incorporated into the formulation. These materials are generally categorized as fibers, flakes, granules, and mixtures. Specific examples include, but are not limited to, ground mica, mica flakes, silica slag, diatomaceous earth, hydrated borate, graded sand, diatomaceous earth, gilsonite, ground coal, charcoal, cellophane flakes or strips, cellulose fiber, expanded perlite, shredded paper or paper pulp, and the like, walnut or other nut hulls ground to different sizes, cottonseed hulls or cottonseed bolls, sugar cane fibers or bagess, flax, straw, ground hemp, ground fir bark, ground redwood bark and fibers, and grape extraction residue, crystalline silicas, amorphous silicas, clays, calcium carbonate, and barite. Suitable amounts of additional solid agents for use in combination with the copolymer(s) and/or ionomer(s) would be apparent to those skilled in the art.

The following examples will serve to illustrate the invention disclosed herein.

EXAMPLES

In the examples:

"Polyol-1" is a 2-hydroxyethyl methacrylate (HEMA) capped PO polyol manufactured according to Scheme 1:

Scheme 1

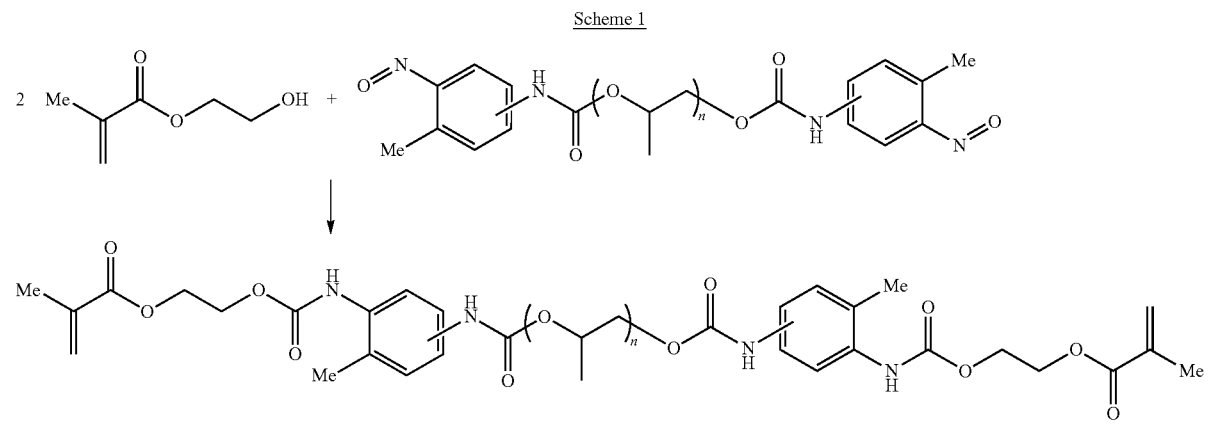

whereby an 8 oz wide-mouth jar is charged with poly(propylene glycol)tolylene 2,4-diisocyanate (50 gram (g), about 0.043 moles of NCO), 2-hydroxyethyl methacrylate (5.6 g, 0.043 moles) and 1-2 drops of Sn(II) stannous octoate (T-9 catalyst). The solution is stirred overnight under nitrogen at ambient temperature. The progress of the reaction is monitored by IR, noting the disappearance of the NCO stretching frequency.

The following materials all available from Aldrich:
"Polyol-2" is poly(ethylene glycol)diacrylate having a number average molecular weight (Mn) of 700;
"Polyol-3" is poly(propylene glycol)diacrylate (PG) having a Mn of 800;
"Polyol-4" is poly(propylene glycol)tolylene 2,4-diisocyanate terminated comprising 3.6 percent NCO;
"Polyol-5" is 2-hydroxyethyl methacrylate;
"TDI" is tolylene-2,4-diisocyanate;
"AIBN" is azobisisobutyronitrile;
"Lauryl peroxide"; and
"t-BuOOH" is tert-Butyl peroxide.

The compositions for Examples 1 to 12 are shown in Table 1. The samples are prepared by weighing 5 grams (g)

of the polyol into a vial and then mixing with 0.1 percent of the appropriate initiator at ambient temperature (about 23° C.). If the initiators are in a solid form (i.e. AIBN, lauryl peroxide), 100 mg of the initiator is dissolved in 1 milliliter (ml) of acetone. For the addition of the initiator (AIBN) to the HEMA-TDI-PO polyol at a temperature above the initiator activation temperature (90° C.), AIBN is dissolved in NMP solvent (100 milligram (mg) in 1 ml).

Samples are evaluated using a Dynamic Mechanical Analysis (DMA): Sample viscosity is tested using parallel plate fixtures on a TA Instruments ARES Rheometer. A 40 mm top and 50 mm bottom plate are installed on the rheometer to test the samples, and the temperature is ramped from room temperature at 3° C. per minute to 150° C. using the oven controller and plant nitrogen supply. The gap is set at 1.000 mm. Samples are run in dynamic mode with a strain setting of 100 percent and a frequency of 1 Hertz. The runs are terminated after the G'/G" crossover point is reached.

G' is the storage modulus and G" is the loss modulus. When G'=G", this is defined as the cross-over (when G' and G" lines intersect) or the gel point, in other words where the liquid becomes solid and most of the curing is complete. The storage and loss modulus in viscoelastic solids measure the stored energy, representing the elastic portion, and the energy dissipated as heat, representing the viscous portion.

TABLE 1

| Example | Acrylate Polyol | Initiator | Initiator addition Temperature, ° C. | G'/G" Crossover, ° C. |
|---|---|---|---|---|
| 1 | Polyol-1 | t-BuOOH | Ambient | 125.4 |
| 2 | Polyol-1 | Lauryl peroxide | Ambient | 91.5 |
| 3 | Polyol-1 | AIBN | Ambient | 81 |
| 4 | Polyol-2 | t-BuOOH | Ambient | 131.2 |
| 5 | Polyol-2 | Lauryl peroxide | Ambient | 101 |
| 6 | Polyol-2 | AIBN | Ambient | 80.2 |
| 7 | Polyol-3 | t-BuOOH | Ambient | 132.4 |
| 8 | Polyol-3 | Lauryl peroxide | Ambient | 90.4 |
| 9 | Polyol-3 | AIBN | Ambient | 82 |
| 10 | 1:1 - Polyol-1:Polyol-2 | ABIN | Ambient | 85 |
| 11 | 3:1 - Polyol-1:Polyol-2 | ABIN | Ambient | 88 |
| 12 | Polyol-1 | ABIN | 90 | 95 |

Figure 1:
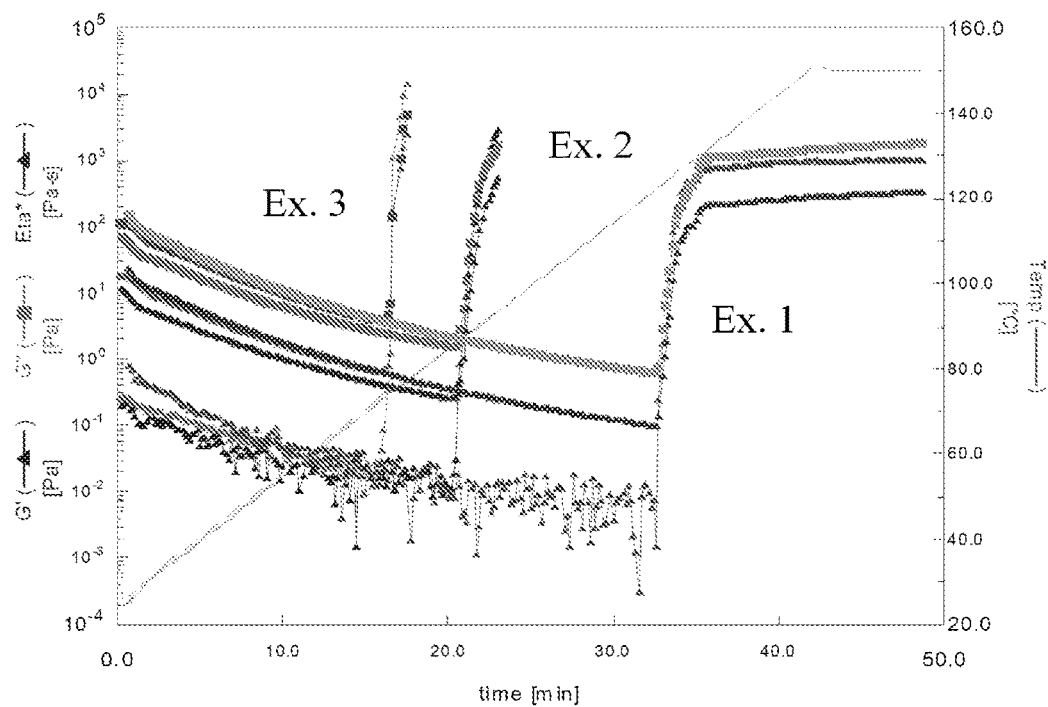
FIG. 1 is a plot of transient visocelastic modulus properties versus time generated by Dynamic Mechanical Analysis (DMA) for Examples 1, 2, and 3.
Figure 2:
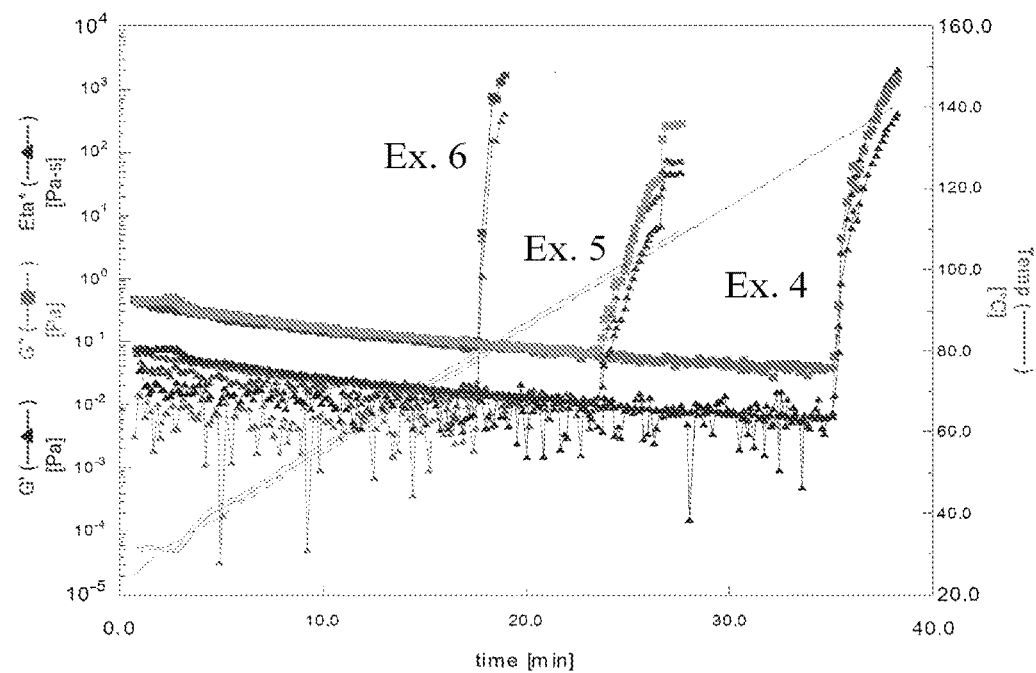
FIG. 2 is a plot of transient visocelastic modulus properties versus time generated DMA for Examples 4, 5, and 6.
Figure 3:
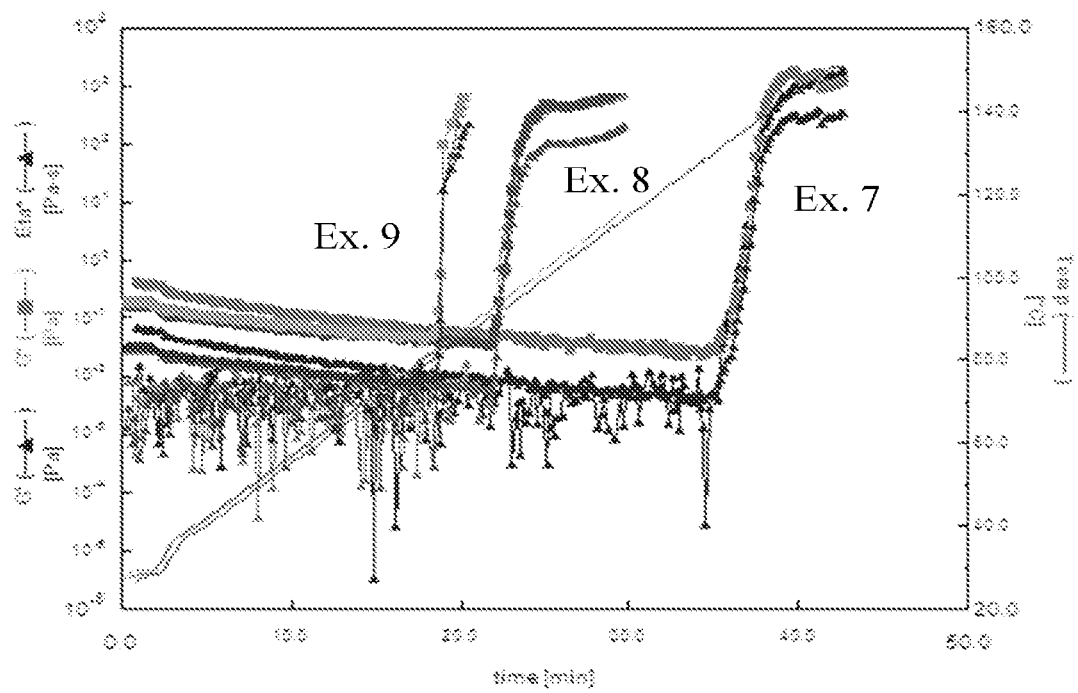
FIG. 3 is a plot of transient visocelastic modulus properties versus time generated DMA for Examples 7, 8, and 9.
Figure 4:
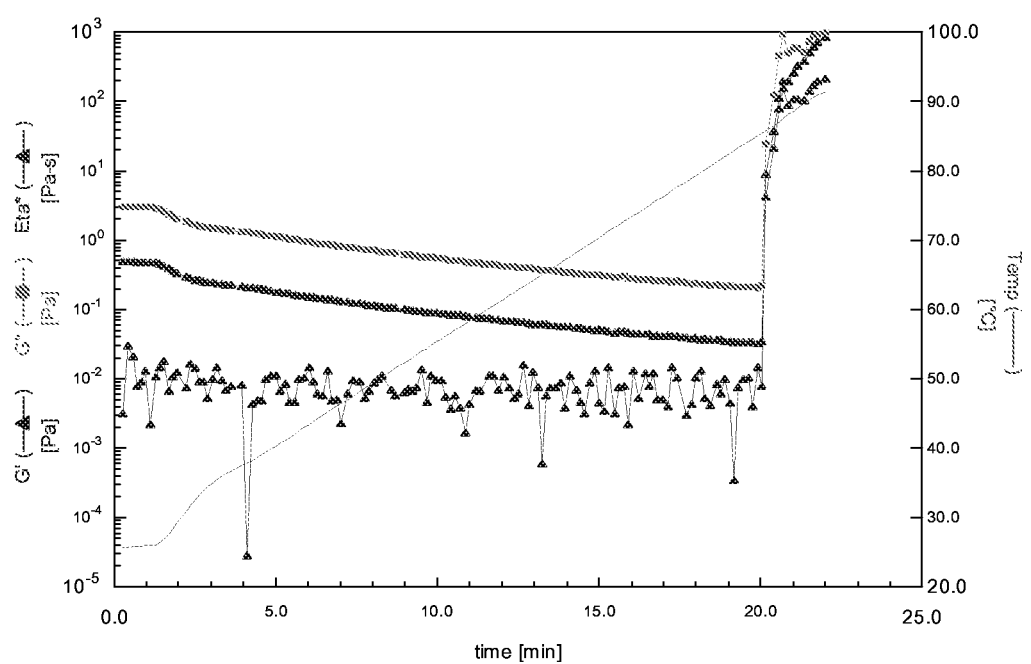
FIG. 4 is a plot of transient visocelastic modulus properties versus time generated DMA for Example 10.

The results for Examples 1, 2, and 3 are demonstrated in FIG. 1.
The results for Examples 4, 5, and 6 are demonstrated in FIG. 2.
The results for Examples 7, 8, and 9 are demonstrated in FIG. 3.
The results for Example 10 are demonstrated in FIG. 4.
The results for Example 11 are demonstrated in FIG. 5.
The results for Example 12 are demonstrated in FIG. 6.

The invention claimed is:

1. A method for reducing the loss of drilling fluids and other well servicing fluids into a subterranean formation during drilling or construction of a borehole in said formation consisting of the steps of
   i providing to the borehole a curable composition useful as a drilling well lost circulation material, said curable composition consisting of
      a an organic compound capable of free radical (co) polymerization described by the following formula:

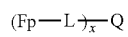

wherein:
   x is an integer from 1 to 8;
   Fp is derived from a vinyl ether, a vinyl ester, an allyl ether, an allyl ester, a vinyl ketone, styrene, α-methylstyrene, a vinyl amide, an allyl amide, an acrylamide, a maleate, a fumarate, or a (meth)acrylate selected from triethyleneglycol dimethacrylate, ethyleneglycol dimethacrylate, tetraethyleneglycol dimethacrylate, polyethyleneglycol, diacrylate, polyethyleneglycol dimethacrylate, 1,3-butyleneglycol dimethacrylate, trimethylol propane trimethacrylate, neopentylglycoldimethacrylate, ethoxylated Bisphenol A dimethacrylate, Bisphenol F dimethacrylate, propoxylated Bisphenol C dimethacrylate, Bisphenol A bis(2-hydroxy-propyl)dimethacrylate, or 2-hydroxyethyl methacrylate;
   L is an organic moiety comprising a (substituted) aromatic or (substituted) aliphatic group comprising one or more O, N, S, or combinations thereof; and
   Q comprises a substituted or unsubstituted mono- or polyvalent organic radical derived from a polyalkylene oxide polyol, an amine terminated polyalkylene oxide, a hydroxyl terminated polyolefin, an amine terminated polyolefin, a silyl carbinol, a (co)polystryrenic, polymer, or mixtures thereof, b one or more initiator, and c one or more inhibitor, wherein one or more inhibitor is independently present in an amount equal to or greater than 0.1 weight percent and equal to or less than 10 weight percent based on the total weight of the curable composition
   and
   ii curing the curable compound in situ downhole.

2. The method of claim 1 wherein said moiety comprising a free radical polymerizable group (Fp) is derived from a (meth)acrylate selected from triethyleneglycol dimethacrylate, ethyleneglycol dimethacrylate, tetraethyleneglycol dimethacrylate, polyethyleneglycol, diacrylate, polyethyleneglycol dimethacrylate, 1,3-butyleneglycol dimethacrylate, trimethylol propane trimethacrylate, neopentylglycoldimethacrylate, ethoxylated Bisphenol A dimethacrylate, Bisphenol F dimethacrylate, propoxylated Bisphenol C dimethacrylate, Bisphenol A bis(2-hydroxy-propyl)dimethacrylate, or 2-hydroxyethyl methacrylate.

3. The method of claim 1 wherein the organic moiety (L) comprises an alkylene group, an oxy group, a thio group, a urethane group, a carboxy group, a carbonyl group, an amido group, a carbamide group, an oxyalkylene group, a thioalkylene group, an carboxyalkylene, an amidoalkylene group, or mixtures thereof.

4. The method of claim 1 wherein the organic moiety (L) comprises an aliphatic ester, an aromatic ester, an amide, a urethane, an ether, or a thioether.

5. The method of claim 1 wherein the organic moiety (L) comprises a urethane derived from an isocyanate, a diisocyanate, or a polyisocyanate.

6. The method of claim 1 wherein the mono- or polyvalent organic radical (Q) is derived from a polyethylene oxide polyol, a polypropylene oxide polyol, a polybutylene oxide polyol, a copolymer of polyalkylene oxide polyol, a terpolymer of polyalkylene oxide polyol, a polytetramethylene oxide polyol, a polyalkylene oxide based on a polyol, a polyester polyol, or a polycarbonate polyol.

7. The method of claim 1 wherein the curable crosslinkable composition contains one or more initiator comprising a peroxide, a peroxy ester, a peroxy carbonate, a hydroperoxide, an alkylperoxide, an arylperoxide, an azo compound, or mixtures thereof.

8. The method of claim 7 wherein one or more initiator is benzoyl peroxide, tert-butyl peroxide, dicumyl peroxide, hydrogen peroxide, diethyl peroxide, azobisisobutyronitrile, or mixtures thereof.

9. The method of claim 1 wherein the one or more inhibitor is hydroquinone, butylated hydroxytoluene (BHT), butylated hydroxyaniline (BHA), 2-hydroxy-4-methoxy benzophenone (UV-9), methyl ethyl hydroquinone (MEHQ), 4-benzyloxy phenol, or 3,5-diisopropyl phenol.

* * * * *